(12) United States Patent
Cheng (10) Patent No.: US 9,191,662 B2
(45) Date of Patent: Nov. 17, 2015

(54) DISPLAY APPARATUS AND ASSOCIATED GLASSES

(75) Inventor: Kun-Nan Cheng, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 778 days.

(21) Appl. No.: 12/978,195

(22) Filed: Dec. 23, 2010

(65) Prior Publication Data

US 2011/0316847 A1 Dec. 29, 2011

(30) Foreign Application Priority Data

Jun. 24, 2010 (TW) ................................ 99120699 A (51) Int. Cl.
| H04N 9/47 | (2006.01) |
|---|---|
| G06T 15/00 | (2011.01) |
| G02B 27/22 | (2006.01) |
| H04N 13/04 | (2006.01) |
| G06F 1/32 | (2006.01) |

(52) U.S. Cl.
CPC ........ H04N 13/0497 (2013.01); G02B 27/2264 (2013.01); G06F 1/325 (2013.01); G06F 1/3231 (2013.01); H04N 13/0438 (2013.01); H04N 2213/008 (2013.01); Y02B 60/1289 (2013.01)

(58) Field of Classification Search
None
See application file for complete search history.

(56) References Cited

U.S. PATENT DOCUMENTS

| 6,188,442 B1* | 2/2001 | Narayanaswami ............ 348/564 |
|---|---|---|
| 2007/0097024 A1* | 5/2007 | Jung et al. ........................ 345/32 |
| 2007/0249286 A1* | 10/2007 | Ma et al. ........................ 455/41.3 |
| 2009/0109282 A1 | 4/2009 | Schnebly et al. |
| 2009/0142041 A1* | 6/2009 | Nagasawa et al. ............. 386/124 |
| 2010/0066819 A1* | 3/2010 | Yu et al. ............................ 348/53 |
| 2010/0085424 A1* | 4/2010 | Kane et al. ........................ 348/53 |
| 2010/0091091 A1* | 4/2010 | Kim ................................ 348/42 |
| 2010/0157425 A1* | 6/2010 | Oh ................................ 359/464 |
| 2010/0177172 A1* | 7/2010 | Ko et al. .......................... 348/53 |
| 2010/0182404 A1* | 7/2010 | Kuno ............................... 348/43 |
| 2010/0194857 A1* | 8/2010 | Mentz et al. .................... 348/43 |
| 2010/0283625 A1* | 11/2010 | Inagawa et al. .......... 340/825.36 |
| 2011/0025821 A1* | 2/2011 | Curtis et al. .................... 348/43 |

FOREIGN PATENT DOCUMENTS

| CN | 201503635 U | 6/2010 |
|---|---|---|
| JP | WO 2010038365 A1 | 4/2010 |
| TW | 200409945 A | 6/2004 |
| TW | M282175 | 12/2005 |
| TW | 200921179 A | 5/2009 |

* cited by examiner

Primary Examiner — Kate Luo (74) Attorney, Agent, or Firm — Edell, Shapiro & Finnan, LLC (57) ABSTRACT

A display apparatus associated with a pair of glasses displays three-dimensional (3D) content. The pair of glass includes a transmitting circuit for establishing bi-directional communication with the display apparatus; and a proximity sensor, which is for sensing whether the pair of glasses is worn, controlling the pair of glasses, and for controlling whether to perform 3D display on the display apparatus. The display apparatus includes an image capturing apparatus, which is for capturing an image, determining whether the pair of glasses is worn, and for controlling the display apparatus and the pair of glasses according to a determination result. The display apparatus includes an image processing module for extracting two-dimensional (2D) content from the 3D content.

8 Claims, 5 Drawing Sheets

DISPLAY APPARATUS AND ASSOCIATED GLASSES

CROSS REFERENCE TO RELATED PATENT APPLICATIONS

This patent application claims priority from Taiwan Patent Application No. 099120699, filed in the Taiwan Patent Office on Jun. 24, 2010, entitled "Display Apparatus and Associated Pair of Glasses", and incorporates the Taiwan patent application in its entirety by reference.

TECHNICAL FIELD

The present disclosure relates to a display apparatus for processing three-dimensional (3D) content, and a pair of glasses associated with the display apparatus, and more particularly, to a 3D content playback system, structured by a pair of positive shutter glasses or negative polarization glasses and a display apparatus, capable of enhancing coordination degrees between the pair of glasses and the display apparatus to provide additional value-added applications.

BACKGROUND OF THE PRESENT DISCLOSURE

In modern information society, a large amount of various types of messages, information, news, knowledge, opinions, ideas, experiences and interactive contents are electronicalized to digital data contents, which are played by an image playback system to users. In order to enhance audible-visual (AV) experience, 3D content playback has become one of most important developing trends of future playback systems.

SUMMARY OF THE PRESENT DISCLOSURE 3D content playback is realized by a pair of positive shutter glasses or negative polarization glasses associated with a display apparatus. For example, transparencies of a left glass and a right glass of the pair of positive shutter glasses are respectively controlled and adjusted to be transmitted though or sheltered by a frame displayed on the display apparatus. When the display apparatus displays a left frame, the left frame is synchronously transmitted through the left glass of the pair of glasses and is synchronously sheltered by the right glass of the pair of glasses to display the left frame to a left eye of a user. When the display apparatus displays a right frame, the right frame is synchronously sheltered by the left glass of the pair of glasses and is synchronously transmitted through the right glass of the pair of glasses to display the right frame to a right eye of a user. The left frame and the right frame are respectively transmitted to the left eye and the right eye of the user, so that a 3D image synthesized by the left frame and the right frame is viewed by the user due to a visual difference between the left frame and the right frame to achieve 3D display.

In order to synchronize transmitting through/sheltering operations of the pair of glasses with frames displayed on the display apparatus, the display apparatus broadcasts a synchronization signal to the pair of glasses, such that the pair of glasses defines timing for adjusting transparencies of the pair of glasses. However, such simple single-directional (i.e., from the display apparatus to the pair of glasses) broadcast communication may limit overall applications of the playback system. For example, the display apparatus can neither confirm an operating status of the pair of glasses nor transmit the operating status of the pair of glasses to the user. When the operating status of the pair of glasses changes, the display apparatus cannot respond to the change. When the playback system comprises a plurality of pairs of glasses respectively worn by users, the display apparatus can neither identity each pair of glasses nor provide an individualized service to each pair of glasses.

The shutter glasses need power supply to drive the left and right glasses when switching between the status of transmitting through and the status of sheltering. Considering about convenience and comfort of wearing the pair of glasses, the shutter glasses is designed as being powered by batteries. However, since power of the batteries is limited, the pair of glasses needs to reduce unnecessary power consumption to increase an operating time. Although the pair of shutter glasses comprises a power switch for shutting down the power supply when the user does not use the pair of glasses, user operating burden is increased. When the user forgets to shut down the power supply once he does not use the pair of glasses, unnecessary power consumption is created. Moreover, the user is unlikely to know the status of remaining power of the batteries.

Although the 3D display may increase AV experience of the user, the user may easily to get tired. Therefore, the display apparatus needs to provide a capability of capturing 2D content from 3D content and performing 2D display, and thus the user may still view the 3D content via a 2D approach. In addition, when the display apparatus only has the 2D display capability, the display apparatus is compatible to the 3D content due to the foregoing 2D content capturing capability.

In order to solve the foregoing problem, one object of the present disclosure is to provide a pair of positive shutter glasses for viewing 3D image content, and the pair of positive shutter glasses comprises two glasses, a glass driver, a controller, a power supply circuit, a receiving circuit and a transmitting circuit. The glass driver drives a glass to change its transparency via a frequency that corresponds to the 3D image content. The controller controls operations of the glass driver, and provides a status signal. The power supply circuit provides power supply to the glass driver and the pair of glasses. The receiving circuit receivers a remote control signal transmitted from the display apparatus. The transmitting circuit generates a corresponding transmission signal according to the status signal, and transmits the transmission signal to the display apparatus, so as to establish bi-directional communication with the display apparatus. For example, the controller of the pair of glasses responds the power supply status of the power supply circuit in the status signal, and the display apparatus broadcasts a power supply status of the pair of glasses to the user via frames and/or audios, so that the user can respond to the power supply status in time. When the user shuts down the power supply of the pair of glasses, and/or the power supply circuit stops providing power to the glass driver, the pair of glasses can respond its power supply status before the power supply is shutdown, so that the display apparatus accordingly stops or pauses playing the 3D content and is switched to 2D display that needs no pair of glasses. Alternatively, the display apparatus can accordingly shut down the power supply or enters a power-saving standby status.

Likewise, the operating status of the glass driver is responded in a status signal that is fed back to the display apparatus. For example, the glass driver controlled by the user switches the left and right glasses to the transmitting through status, and the display apparatus is automatically switched to the 2D display in response to the status signal.

The remote control signal transmitted by the display apparatus is not limited to a synchronization signal, but also comprises various types of instructions and information. The pair of glasses implements the status signal in response to the remote control signal. The pair of glasses comprises a memory circuit for recording operating information of the controller, and the operating information is also responded in the status signal that is fed back to the display apparatus. For example, the pair of glasses builds an identification code in the memory circuit, and the display apparatus transmits an identification instruction in the remote control signal, so that the pair of glasses transmits the identification code to the display apparatus. Accordingly, the display apparatus determines the pair of glasses, and provides an individualized service and application to the pair of glasses. For example, the display apparatus polls different pairs of glasses with respect to different identification codes of the remote control signal, and each pair of glasses determines whether the identification code matches with the built-in identification code. When the determination result is positive, the pair of glasses transmits its operating status back to the display apparatus. Accordingly, each pair of glasses can respectively transmit its operating status (e.g. the power supply status) back to the display apparatus, which can respectively monitor and/or respond to an operating status of a certain pair of glasses.

The pair of glasses comprises a proximity sensor for sensing whether the pair of glasses approximates/or contacts the user and providing a corresponding proximity signal to determine whether the pair of glasses is worn by the user according to the proximity signal, which is responded in the status signal via the controller, so that the display apparatus and the pair of the glasses operate according to the status signal. For example, when the user wears the pair of glasses, the pair of glasses automatically awakes from the power-saving standby status, and the display apparatus simultaneously automatically enables the power supply, and/or begins with the 3D display according to the status signal. Likewise, when the user does not wear the pair of glasses, the pair of glasses automatically enters the standby status, and/or shuts down the power supply. Before the power supply is shutdown, the display apparatus is informed via the status signal of simultaneously stopping 3D display, switching to 2D display, and entering the standby status and/or shutting down the power supply.

A transmitting circuit function of the pair of glasses is realized by a light signal of the pair of glasses. The pair of glasses instructs the user its operating status (e.g., whether the power supply is enabled) via visible lights of the light signal. According to the present disclosure, the pair of glasses transmits an encoded/modulated status signal to the display apparatus via the light signal of the pair of glasses, e.g., the status signal is responded via a frequency (i.e., a cycle) of sequential shading variations. The frequency of shading variations may be larger than that sensible to a human eye, but not undesirably influencing the original instruction function. The display apparatus comprises an image capturing device for capturing the status signal of the light signal. In addition, the transmitting circuit of the pair of glasses transmits infrared electromagnetic waves, and carries the status signal of the pair of glasses via an infrared signal. The display can receive the status signal of the pair of glasses via a conventional infrared remote control receiving circuit. The transmitting circuit of the pair of glasses and the corresponding receiving circuit of the display apparatus may be a radio-frequency (RF) or Bluetooth electromagnetic transmitting circuit and an associated receiving circuit.

Another object of the present disclosure is to provide a pair of glasses applied to 3D display. The pair of glasses comprises two glasses, a glass driver, a proximity sensor and a power supply circuit. The proximity sensor senses whether the pair of glasses is worn to generate a corresponding proximity signal. The glass driver determines whether to drive the glasses according to the proximity signal. When the pair of glasses is worn, the glass driver automatically drives the glasses; otherwise, the glass driver automatically stops driving the glasses to reduce power consumption. Alternatively, the power supply circuit determines whether to provide power supply to the glass driver according to the proximity signal. The pair of glasses further comprises a transmitting circuit for generating and transmitting a corresponding transmission signal according to the proximity signal and the glass controller.

Yet another object to the present disclosure is to provide a display device comprising a displayer, a controller and a receiving circuit. The display apparatus associated with the pair of glasses forms a playback system having a 3D display capability. The displayer operative in a 3D mode and a 2D mode respectively displays 3D image content and 2D image content. The controller controls an operating mode of the displayer and operations of the display apparatus/playback system. The receiving circuit receives a status signal, and the controller switches the operating mode of the displayer according to the status signal, e.g., the operating mode is changed from the 3D mode of 3D display to the 2D mode of 2D display. The status signal is transmitted by a remote control of the display apparatus, or is transmitted from the pair of glasses.

According to the status signal positively transmitted from the pair of glasses, the playback system is provided with a plurality of value-added applications as mentioned above. For example, the controller of the display apparatus provides status content according to the status signal, and plays the status content via the displayer, so that the user of the pair of glasses can obtain the operating status of the pair of glasses according to display of the display apparatus, e.g., the operating status indicates remaining power of the pair of glasses. The displayer of the display apparatus switches the 2D mode and the 3D mode according to the status signal, and the power supply circuit of the display apparatus also controls a power supply status of the display apparatus.

The display apparatus further comprises an image processing module for capturing 2D content from 3D content, which carries at least one group of a left frame and a right frame, and each group of the left frame and the right frame forms a 3D image. The image processing module comprises a format converting module and a scaling module. The format converting module extracts each group of left and right frames from the 3D content, and selects one frame from the group of left and right frames. The scaling module scales the frame selected by the format converting module according to a resolution of the displayer.

Still another object of the present disclosure is to provide a display apparatus associated with a pair of glasses. The display apparatus comprises a displayer, an image capturing apparatus, an identification module and a controller. The image capturing apparatus captures an image. The identification module determines whether the pair of glasses is worn according to the captured image, and provides a corresponding identification result. The controller controls the displayer according to the identification result. The display apparatus further comprises a transmitting circuit for transmitting a remote control signal to the pair of glasses according to the identification result. For example, when the identification module determines that the pair of glasses is worn, the displayer automatically begins with 3D display, and transmits the remote control signal to the pair of glasses, which automatically awakes from a standby status and/or begins facilitating 3D display. When the identification module cannot determine that the pair of glasses is worn, the displayer automatically stops/pauses a 3D mode, switches to a 2D mode, enters the standby status and/or shuts down its power supply. The displayer may transmit the remote control signal to the pair of glasses before the power supply is shutdown, so that the pair of glasses correspondingly stops interleaving driving the left and right glasses that are to be transmitted through, enters the standby status, and/or shuts down the power supply.

Still another embodiment of the present disclosure is to provide a display apparatus comprising a displayer and an image processing module. The displayer displays 2D image content. The image processing module captures 2D image content from 3D image content and displays the 2D image content on the displayer. The 3D image content carries at least one group of left and right frames each comprising a format determining module, a format converting module and a scaling module. The format determining module determines a format of the 3D image content, extracts at least one group of left and right frames from the 3D image content according to the format, and selects one frame from the group of left and right frames as a frame of the 2D image content. The scaling module scales the left frame (or the right frame) selected by the format converting module according to a resolution of the displayer.

Still another embodiment of the present disclosure is to provide a display apparatus associated with a pair of glasses. The display apparatus comprises a displayer, a controller and a transmitting circuit. The displayer is operative in a 3D mode and a 2D mode. The displayer displays 3D image content when operating in the 3D mode, and displays 2D image content when operating in the 2D mode. The controller controls to operate the displayer in either the 3D mode or the 2D mode. The transmitting circuit transmits a radio signal to the pair of glasses according to an audio signal associated with image content.

Still another object of the present disclosure is to provide a pair of glasses for viewing a 3D image output. The pair of glasses comprises two glasses, a receiving circuits and an audio-effect playback unit. The receiving circuit receives a radio signal associated with an audio signal of a 3D image. The audio-effect playback unit generates an audio effect according to the audio signal.

The advantages and spirit related to the present disclosure can be further understood via the following detailed description and drawings.

DETAILED DESCRIPTION OF THE PREFERRED EMBODIMENT

Figure 1:
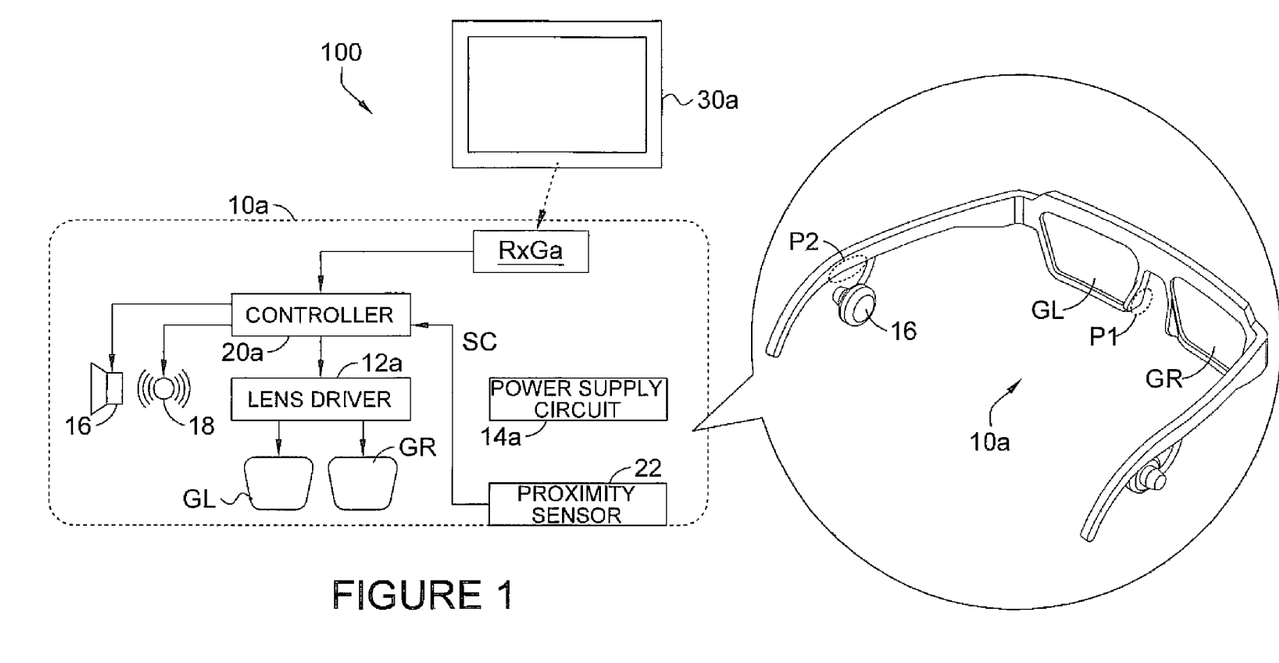
FIG. 1 is a schematic diagram of a pair of glasses in accordance with an embodiment of the present disclosure.

FIG. 1 is a schematic diagram of a pair of glasses 10a in accordance with an embodiment of the present disclosure.

The pair of glasses 10a, for example, is a pair of positive shutter glasses applied to 3D display, and is associated with a display apparatus 30a to form a playback system 100 having a 3D content playback capability. The pair of glasses 10a comprises two lenses GR and GL, a lens driver 12a, a controller 20a, a receiving circuit RxGa, and a power supply circuit 14a. The pair of glasses 10a may further include a proximity sensor 22.

In the pair of glasses 10a, the lenses GR and GL are respectively a left lens and a right lens. The lens driver 12a drives the lenses GR and GL to change transparency, so that a frame displayed on the display apparatus 30a is respectively shielded by or transmitted through the glasses GR and GL. The receiving circuit RxGa receives a remote control signal transmitted by the display apparatus 30a. The controller 20a mainly controls overall operations of the pair of glasses 12a, and controls operations of the lens driver 12a according to the remote control signal received by the receiving circuit RxGa. The power supply circuit 14a provides power supply to the lens driver 12a and the pair of glasses 10a.

A situation of performing 3D display by the playback system 100 is described below. The display apparatus 30a transmits the remote control signal to the pair of glasses to synchronize the pair of glasses with the display apparatus 30a. When the display apparatus 30a displays a left frame, the left lens GL is transparent at the same time and thus the left frame is synchronously transmitted through the lens GL, so that the viewer wearing the glasses can correctly see the left frame GL; meanwhile, the right lens GR is non-transparent to an extent that it shields viewer's right eye from seeing the left frame from the display. Similarly, when the display apparatus 30a displays a right frame, the right frame is shielded by the left lens GL; meanwhile, the right lens GR is transparent enough that the right frame is seen by the viewer through the right lens GR. The left frame and the right frame are respectively transmitted to the left eye and the right eye of the viewer, so that the viewer perceives a 3D image synthesized by the left frame and the right frame due to parallax between the left frame and the right frame.

The pair of glasses 10a also selectively has a speaker 16 (e.g., a single-channel or multi-channel earphone), and/or a vibration unit 18. 3D content (i.e., 3D image content) played by the display apparatus 30a comprises sound data (i.e., audio data) and/or vibration data. When the display apparatus 30a plays the 3D content, the audio data and/or vibration data is carried in the remote control signal, which is transmitted to the pair of glasses 10a and is received by the receiving circuit RxGa of the pair of glasses 10a. The speaker 16 converts the audio data to audio waves, and the vibration unit 18 converts the vibration data to vibrations that are practically sensible to the user, so as to enhance telepresence experience of viewing the 3D content.

In the pair of glasses 10a of the present embodiment, the proximity sensor 22 is included to sense whether the pair of glasses 10a is worn to generate a corresponding proximity signal SC. The controller 20a controls the lens driver 12a according to the proximity signal SC to determine whether to drive the lenses GR and GL. That is, when the proximity signal SC indicates that the pair of glasses 10a is worn, the glass driver 12a drives the lenses GR and GL to perform 3D display. When the pair of glasses 10a has not yet been worn, the lens driver 12a stops driving the lenses GR and GL to reduce power consumption.

Alternatively, the controller 20a controls operations of the power supply circuit 14a according to the proximity signal SC to determine whether to provide power supply to the lens driver 12a and/or an overall pair of glasses 10a. For example, when the proximity sensor 22 senses that the pair of glasses 10a is worn by the user, it means that the user wishes to view the 3D content, and the power supp circuit 14a provides power supply to the glass driver 12a for driving the lenses GR and GL. When the proximity sensor 22 senses that the pair of glasses 10a has not yet been worn (e.g., when the user takes off the pair of glasses), the controller 20a and the power supply circuit 14a enters a power-saving standby status. For example, the power supply circuit 14a stops providing power supply to the lens driver 12a and the receiving circuit RxGa (even the speaker 16 and/or the vibration 18), and only provides power supply to the proximity sensor 22, which periodically determines whether the pair of glasses 10a is worn by the user. When the proximity sensor 22 again determines that the pair of glasses 10a is worn, the controller 20a awakes from the standby status, and the power supply circuit 14a provides power supply to the receiving circuit RxGa and the glass driver 12a (and the speaker 16 and/or the vibration 18). In addition, when the pair of glasses 10a has not yet been worn, the power supply circuit 14c is halted, and the proximity sensor 22 stops operating. The user again enables the power supply of the pair of glasses 10a by turning on a power supply switch (not shown in FIG. 1) of the pair of glasses 10a.

In other words, the pair of glasses 10a is automatically activated/de-activated according to whether it is worn by the user. The pair of glasses 10a reduces unnecessary power consumption and functions more effectively to extend usage lifetime of the pair of shutter glasses.

When the pair of glasses 10a is realized, the proximity sensor 22 can be a mechanical push-button switch, disposed at which the pair of glasses touch the user, e.g., a position P1 approximate to the nose pad of the user, and/or a position P2 at the frame ends of the pair of glasses as shown in FIG. 1. When the user wears the pair of glasses 10a, the mechanical push-button switch at the foregoing positions are pressed due to touch with the human body, so that the proximity sensor 22 determines that the pair of glasses 10a is worn. When the user does not wear the pair of glasses 10a, the mechanical push-button switch is released, so that the proximity sensor 22 determines that the pair of glasses is not in use. In addition, the proximity sensor 22 is manufactured of piezoelectric materials, which is capable of transmitting different electrical signals as a proximity signal SC according to different applications of force. In another embodiment, the proximity sensor 22 is an infrared or ultrasonic range finder, senses approaching of objects to determine that the pair of glasses 10a is worn. Alternatively, in another embodiment, the proximity sensor 22 is formed by a transmitter and a receiver (e.g., a low-power infrared transmitter or a sensing circuit). The transmitter is disposed at one end of the glasses, and the receiver is disposed at another end of the glasses. A path signal is formed between the transmitter and the receiver, when the path is interrupted and the signal is lost, it means that the pair of glasses 10a is worn.

Figure 2:
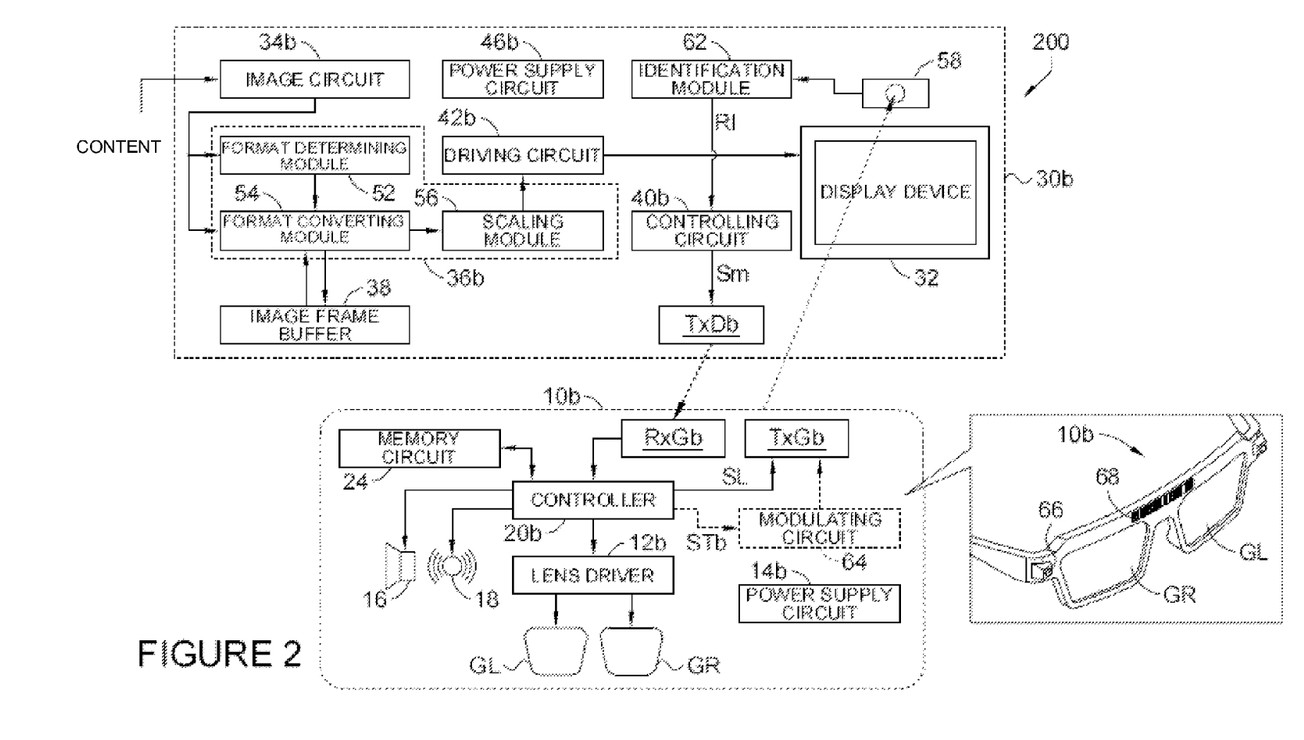
FIG. 2 is a schematic diagram of a playback system in accordance with another embodiment of the present disclosure.

FIG. 2 shows a schematic diagram of a playback system 200 in accordance with an embodiment of the present disclosure. The playback system 200 performs 3D display by the display apparatus 30b associated with the pair of glasses 10b. The display apparatus 30b comprises a display 32, a controller 40b, a power supply circuit 46b, a transmitting circuit TxDb, an image circuit 34b, an image processing module 36b, an image frame buffer 38, and a driving circuit 42b. The image circuit 34b receives audile-visual (AV) data content, and performs appropriate demodulating/decoding to retrieve to-be-broadcast data from the AV data content, such as frame data, audio data and/or vibration data. Through a memory space provided by the image frame buffer 38, the image processing module 36b retrieves frames (i.e., image frames) from the frame data, and arranges timing for playing the retrieved frames. The driving circuit 42b drives the display 32 to play the frames provided by the image processing module 36b. The controller 40b mainly controls operation of the display apparatus, and the power supply circuit 46b controls power supply of the display apparatus 30b.

Similar to the pair of glasses 10a in FIG. 1, the pair of glasses 10b of the present embodiment in FIG. 2 comprises a controller 20b, a lens driver 12b, lenses GR and GL, and a receiving circuit RxGb. The pair of glasses 10b alternatively includes an audio playback unit, e.g., a speaker (or an earphone) 16 and a vibrator 18. The controller 40b of the display apparatus 30b transmits a remote control signal Sm to the pair of glasses 10b via the transmitting circuit TxDb. For example, the remote control signal Sm includes a synchronization signal for 3D display. When the receiving circuit RxGb of the pair of glasses 10b receives the remote control signal Sm, the controller 20b of the pair of glasses 10b coordinates timing for operating the lens driver 12b to realize the 3D display with association of the display apparatus 30b. In addition, on top of transmitting the remote control signal, the transmitting circuit also transmits a radio signal (or contained in the remote control signal) according to an audio signal of image content to further generate an audio effect, e.g., music or vibration. It is to be noted that, the display apparatus in this embodiment does not have capability of receiving the radio signal. The pair of glasses 10b may only comprise a receiving circuit and an audio-effect playback unit. When the user wears a pair of 3D glasses to view 3D content, the pair of 3D glasses receives an audio signal associated with the 3D content, and converts the audio signal to an audio effect, e.g., the audio signal is converted to music or vibration that is played via the audio-effect playback unit. For example, the pair of 3D glasses comprises an earphone having a radio receiving circuit, e.g., Bluetooth, and the Bluetooth earphone receives an audio signal transmitted from the display apparatus and generates an audio effect according to the audio signal.

In order to enhance the capabilities of the display apparatus 30b, the image processing module 36b captures 2D content from the 3D content, and displays frames of the 2D content on the display 32. In other words, the display 32 operating in a 3D mode and a 2D mode respectively displays content of a 3D format and content of a 2D format. The content of the 2D format is retrieved from the content of the 3D format to display the content of the 3D format via the 2D format. As mentioned above, the user may easily get tired when viewing the content of the 3D format for a long time, and even feels uncomfortable. It is desired that the 3D content can be changed to the 2D format so that users can opt to view the content in 2D format which is more comfortable for long term watch. When left frames and right frames of the 3D content are displayed in turns on the display without being processing by the pair of shutter glasses, the user directly viewing the frames may sense the frames are motion-blurred due to a visual difference between the left and right frames.

In order to accurately display the 3D content via the 2D format as shown in FIG. 2, the image processing module 36b further comprises a format determining module 52, a format converting module 54 and a scaling module 56. The format determining module 52 determines a format for carrying left and right frames of a 3D image in the 3D content. The format converting module 54 retrieves the left and right frames (temporarily stored in the image frame buffer 38) from the 3D content according to protocols of the format, and selects one of the left and right frames to form the frame of the 2D content. For example, the format converting module 54 fixedly selects the left frame of the 3D image to form the 2D content that is to be displayed. Accordingly, the user can comfortably view the 3D content via the 2D format display. In addition, since the frames retrieved by the format converting module 54 may not conform to a resolution of the display 32, the scaling module 56 performs appropriate horizontal/vertical scaling on the retrieved frames to conform to the resolution of the display 32. Operations of the image processing module 36b are to be described below. In another embodiment, the image processing module 36b also comprises an image circuit, a controller and a driver.

In addition to the capability of displaying the 3D content via the 2D format display, the display apparatus further comprises an image capturing apparatus 58 and an identification module 62 for providing a further value-added application to the playback system 200. The image capturing apparatus 58 captures an image, such as human faces. The identification module 62 determines whether the pair of glasses 10b is worn on the faces according to the captured image, and provides a corresponding identification result RI. The controller 40b controls the display 32 (and the display apparatus 30b) according to the identification result RI. For example, when the identification module 62 determines that the pair of glasses 10b is worn, the controller 40b automatically controls the display 32 to perform 3D display. When the identification module 62 does not determine that the pair of glasses 10b is worn, the controller 40b automatically controls the image processing module 36b to begin capturing the 2D content from the 3D content, and the display 32 also stops the 3D mode and automatically switches to the 2D mode to display the 3D content via the 2D display.

In this embodiment, when the identification module 62 determines that the pair of glasses 10b is not worn, the display apparatus automatically pauses and enters the standby status. Power supply circuit 46b halts providing power for the driver circuit 42b and the display 32 to reduce unnecessary power consumption. Power supply for the image circuit 34b, the image processing module 36b and the image frame buffer 38 also pauses (or only reserve partial power supply for temporarily storing a current play position). Power supply for the transmitting circuit TxDc is stopped, and part of the functions of the controller 40b are shutdown to further reduce power consumption. Power supply circuit 46b can still provide power supply to the image capturing apparatus 58 and the identification module 62 to periodically detect if the pair of glasses 10b is again worn. When the pair of glasses 10b is again worn, the identification module 62 awakes the controller 40b via the identification result RI, and the power supply circuit 46b automatically recovers to provide power supply to the display apparatus 30b.

In another embodiment, when the identification module 62 does not detect that the pair of glasses 10b is worn, the display apparatus 30b is completely shutdown, e.g., even the image capturing apparatus 58 and the identification module 62 completely stop operating. In one case, users can re-enable power supply of the display apparatus 30b via a power supply switch (not shown) of the display apparatus 30b. Alternatively, when the identification module 62 does not detect that the pair of glasses 10b is worn, the controller 40b inquires the user whether to switch the display apparatus 30b to the 2D mode, whether the display apparatus 30b needs to enter the power-saving standby status, and/or whether to shut down the power supply of the display apparatus 30b by means of images or audios shown on the display 32. In another embodiment, when the identification module 62 does not detect that the pair of glasses 10b is worn, the controller 40b decides whether it is switched to the 2D mode or the standby status according to characteristics of the 3D content. For example, when the 3D content is 3D live (i.e., real-time) broadcast content, the controller 40b switches to the 2D display when the pair of glasses 10b is not being utilized. When the 3D content is not real-time broadcast content, the controller 40b enters the standby status.

In other words, automatic operation switch of the display apparatus 30b is triggered by actions of wearing and taking off the pair of shutter glasses. In another embodiment, the controller 40b of the display apparatus 30b controls the pair of glasses 10b according to the identification result RI. For example, when the identification module 62 determines that the pair of glasses 10b is not worn, the controller 40b of the display apparatus 30b sends a standby instruction in the remote control signal Sm to the pair of glasses 10b via the transmitting circuit RxGb. When the pair of glasses 10b receives the remote control signal, the controller 20b of the pair of glasses 10b controls the power supply circuit 14b to reduce power supply, e.g., stopping power supply of the glass driver 12b (and the speaker 16/the vibration 18). The controller 20b also shuts down part of the functions to reduce unnecessary power consumption, and the receiving circuit RxGb needs appropriate power supply for continuously receiving subsequent remote control signals. When the display apparatus 30b determines that the pair of glasses 10b is again worn, the display apparatus 30b awakes the pair of glasses 10b via the remote control signal to recover operations of the pair of glasses 10b.

Various embodiments to realize image identification of a pair of glasses via the image capturing apparatus 58 and the identification module 62 are described below. One of the image identification methods is to search human faces from captured images. When a human face is found, it is further determined whether the pair of glasses is put on by the user distinguishing color and/or shading difference between frame/glasses and the human face. In other embodiment, the glasses can have a predetermined bar code (e.g., a bar code 68 in FIG. 2), lines, patterns and colors on the glasses frame facing the display 32 so that the image identification module can identify the glasses accordingly. Alternatively, the pair of glasses can have a predetermined shape on the front, and the identification module 62 can match the shape of the front surface of the pair of glasses 10b with the captured images to accordingly determine whether the pair of glasses 10b is worn.

In addition, since the lenses GR and GL of the pair of glasses 10b under the control of the display apparatus 30b switches between the status of transmitting through and the status of sheltering, such characteristics are also adopted to determine whether the pair of glasses 10b is worn by the user. For example, when the display unit 32 controls the lenses GR and GL when displaying left and right frames, the image capturing module 58 can synchronously captures images of the glasses and compares differences between the images. When it is determined that the right eye of the user is sheltered and the left eye can be seen from the captured images when the left frames are displayed, or vice versa, it means that the pair of shutter glasses is worn by the user. The image capturing module 58 may captures the images via a higher frequency (e.g., higher than a frame refreshing frequency of the display 32), and analyzes a frequency of shading alternations of the human face according to the consecutively captured images. When a left-right shading alternation frequency of the human face matches with the frame refreshing frequency of the display 32, it is determined that the pair of glasses 10b is worn by the user.

In an embodiment, the user manually controls the pair of glasses 10b to continuously transmit through the lenses GR and GL (i.e., the 3D function of the pair of 3D glasses is shutdown) so as to view frames of the 2D display. When the identification module 62 determines that the pair of glasses 10b is worn by the user and the glasses GR and GL are transmitted through, the display 32 of the display apparatus 30b is automatically switched to the 2D mode, e.g., the 3D content is displayed via the 2D display.

In another embodiment of the present disclosure, the image capturing apparatus 58/the identification module 62 determines whether the pair of glasses 10b is worn according to a light signal of the pair of the glasses 10b, which also instructs its operating status to the user (e.g., a light signal 66 in FIG. 2). This operating status indication helps users to make sure whether the pair of glasses 10b is turned on. Referring to FIG. 2, the controller 20b reflects the operating status of the pair of glasses 10b via the light signal control signal SL, and the transmitting circuit TxGb of the pair of glasses 10b transmits the visible instruction of light signal to the user according to the light signal control signal SL. The display apparatus 200 in this embodiment determines whether the pair of glasses 10b is worn by the user according to the light signal. For example, when the identification module 62 determines from the captured images that the pair of glasses 10b is worn by the user, as well as the light signal, it is determined that the pair of glasses 10b is worn by the user.

Functions and applications of the display apparatus 200 are further expanded by utilizing the instruction light signal of the pair of glasses 10b. For example, the pair of glasses 10b transmits an encoded/modulated signal to the display apparatus 30b via a light signal transmitted from the transmitting apparatus TxGb to establish a bi-directional communication channel with the display apparatus 30b. Referring to FIG. 2, the pair of glasses 10b comprises a modulating circuit 64 for modulating a status signal provided by the controller 20b. For example, according to a pulse-width modulation (PWM) principle, the modulating circuit 64 controls the transmitting circuit TxGb to show content of the status signal STb via a sequential shading alternation frequency (i.e., period) of the light signal. The shading alternation frequency is greater than a frequency perceptible to human eyes without undesirably affecting original instruction functions of the light signal. When the image capturing apparatus 58 of the display apparatus 30b captures images of the light signal, the identification module 62 demodulates the images, such that the controller 40b of the display apparatus 30b can receive the status signal STb fed back by the pair of glasses 10b.

After the bi-directional communication channel is established between the pair of glasses 10b and the display apparatus, more value-added applications are provided. For example, the controller 20b of the pair of glasses 10b includes the power supply status of the power supply circuit 14b in the status signal STb, and the display apparatus 30b broadcasts the power supply status of the pair of glasses 10b (e.g., remaining power, an estimative operating time or a power exhaustion alarm) to the user via icons, pictures or audio, so that the user can respond in time. In addition, as mentioned above, the left and right lenses GR and GL driven by the lens driver 12b are turned to be transparent at the same time. At this point, the pair of glasses 10b informs the display apparatus 30b via the status signal STb, and the display apparatus 30b is accordingly automatically switched to the 2D mode.

The remote control signal Sm transmitted from the display apparatus 30b to the pair of glasses 10b not only comprises synchronization signals of the 3D display, but also comprises various types of instructions and information. The pair of glasses 10b also transmits out the status signal STb which is corresponding to the remote control signal Sm of the display apparatus 30b. For example, the pair of glasses comprises a memory circuit 24 for recording operating information for the controller 20b. The operating information is included in the status signal STb that is fed back to the display apparatus 30b.

Figure 3:
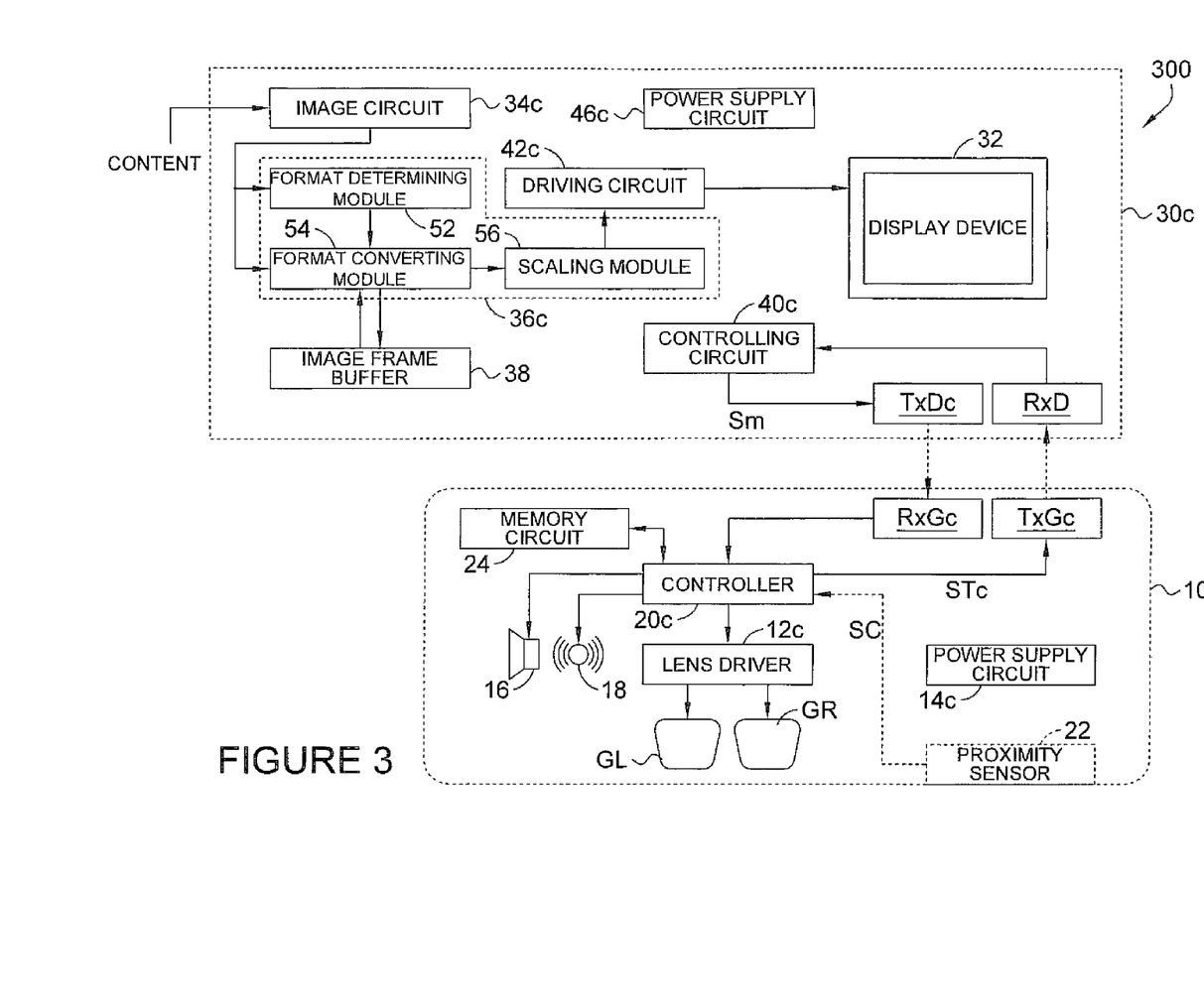
FIG. 3 is a schematic diagram of a playback system in accordance with yet another embodiment of the present disclosure.

FIG. 3 is a playback system 300 in accordance with an embodiment of the present disclosure. The playback system 300 comprises a pair of glasses 10c associated with a display apparatus 30c. The display apparatus 30c comprises a display 32, a controller 40c, a power supply circuit 46c, a transmitting circuit TxDc, a receiving circuit RxD, an image circuit 34c, an image processing module 36c, an image frame buffer 38, and a driving circuit 42c. Operations of the image circuit 34c, the image processing module 36c, the image frame buffer 38 and the driving circuit 42c are similar to those of the image processing circuit 34b, the image processing module 36b, the image frame buffer 38 and the driving circuit 42b in FIG. 2. The image processing module 36c also retrieves 2D content from 3D content, so that the 3D content is displayed via the 2D display on the screen of the display 32. The controller 40c mainly controls operations of the display apparatus 30c, and the power supply circuit 46c controls power supply of the display apparatus 30c.

Similar to the pair of glasses 10b in FIG. 2, the pair of glasses 10c in FIG. 3 comprises a controller 20c, a lens driver 12c, lenses GR and GL, a receiving circuit RxGc, and a memory circuit, and selectively comprises an earphone 16 and a vibrator 18. The controller 40c of the display apparatus 30c transmits a remote control signal Sm to the pair of glasses 10c via the transmitting circuit TxDc. For example, the remote control signal Sm comprises a synchronization system of the 3D display. When the receiving circuit RxGc of the pair of glasses 10c receives the remote control signal Sm, the controller 20c coordinates operating timing for the lens driver 12c to realize the 3D display with association of the display apparatus 30c.

In an embodiment, the pair of glasses 10c further comprises a transmitting circuit TxGc for encoding/modulating the status signal STc provided by the controller as electromagnetic transmission signal to be transmitted. Correspondingly, the receiving circuit RxD of the display apparatus 30c receives and demodulates/decodes the status signal STc of the transmission signal to an electronic status signal STc, so that the controller 40c of the display apparatus 30c receives the status signal STc fed back from the pair of glasses 10c. The transmitting circuit TxGc/the receiving circuit RxD and the transmitting circuit TxDc/the receiving circuit RxGc are integrated together to establish a bi-direction communication channel between the pair of glasses 10c and the display apparatus 30c. The receiving circuit RxD of the display apparatus 30c is a remote control receiving circuit of the display apparatus 30c, or is an additional receiving circuit other than a remote control receiving circuit. The transmitting circuit TxGc and the receiving circuit RxD transmit/receive the status signal STc via infrared rays, radio frequency (RF) signals, Bluetooth and practical wires.

As discussed in FIG. 2, various types of value-added applications of the playback system 300 are extended by establishing the bi-directional communication channel between the pair of glasses 10c and the display apparatus 30c. For example, the controller 20c of the pair of glasses 10c reflects a power supply status of the power supply circuit 14c and/or an operating status of the pair of glasses 10c in the status signal STc, which allows the display apparatus 30c to show the power supply status and/or the operating status of the pair of glasses 10c to the user by on-screen display (OSD). Since space for a pair of shutter glasses displaying its operating status is extremely limited, usually it can only show some basic operating status (e.g., a status of a power supply switch) by light signal, which is unlikely to display any further detailed status of the pair of glasses 10c. Moreover, the user needs to take off the pair of shutter glasses to view the instruction light signal displayed by the operating status. According to the present disclosure, it allows the user to directly view the operating details of the pair of glasses 10c on the display 32 without taking off the glasses.

In addition, when the user shuts down the power supply of the pair of glasses 10c and/or the power supply circuit 14c of the pair of glasses 10c stops providing power supply to the glass driver 12c, the transmitting circuit TxGc of the pair of glasses 10c transmits its status to the display apparatus 30c before the power supply is interrupted, so that the display apparatus 30c accordingly stops or pauses 3D content display, i.e., the display apparatus 30c is automatically switched to the 2D display. Alternatively, in another example, the display apparatus 30c enters the power-saving standby status (i.e., pause and/or reduce power supply of the driver circuit 42c, the display 32, the image circuit 34c, the image processing module 36c, the image frame buffer 38, the transmitting circuit TxDc and/or the controller 40c, but maintains the power supply of the receiving circuit RxD), or completely shuts down power supply (i.e., power supply of the receiving circuit RxD is also stopped). When the user again applies the pair of glasses 10c (e.g., the power supply switch of the pair of glasses 10c is again enabled), the pair of glasses 10c can spontaneously send out the status signal STc to trigger the display apparatus 30c to awake in order to play the 3D content or to switch the 2D display to the 3D display. That is, when the user operates the pair of glasses 10c, the display apparatus 30c can automatically perform corresponding operations, i.e., the display apparatus 30c is remotely controlled by the pair of glasses 10c.

When the display apparatus 30c transmits an instruction and information within the remote control signal Sm to the pair of glasses 10c, the pair of glasses 10c responds with the status signal STc. For example, the playback system 300 can match with a plurality of shutter glasses 10c, and each pair of shutter glasses 10c has a built-in identification code in its memory circuit 24. The display apparatus 30c transmits an identification instruction in the remote control signal Sm, so that each pair of glasses 10c transmits its identification code back to the display apparatus 30c. Accordingly, the display apparatus 30c identifies each pairs of glasses, and provides a customized service and application to each pairs of glasses. For example, the display apparatus 30c polls different pairs of glasses with respect to different identification codes in the remote control signal Sm, so that each pair of glasses can respectively transmit its operating status (e.g., the power supply status) back to the display apparatus 30c, which respectively monitors and/or responds to an operating status of a pair of glasses. Through the remote control signal Sm, the display apparatus 30c respectively provides a corresponding service and application to each pair of glasses. For example, the display apparatus 30c respectively records an operation time length, an operation start time and an operation end time, and/or already displayed 3D content or/and what is being viewed; access control can also be realized, for example, certain pairs of glasses may be prevented from viewing certain 3D content. Or, in some examples, when power supply of certain pair of glasses is exhausted, the display apparatus 30c informs the user by the speaker of the pair of glasses without interfering other users of pairs of glasses. In addition, the display apparatus 30c also records a plurality of operating parameters of each pair of glasses, e.g., a predetermined audio volume of a speaker. Therefore, glasses assigned with different identification codes can turn to their predetermined audio volumes for the speakers respectively. Compared to the pair of glasses 10c, the display apparatus 30c having better operation resources (e.g., more data storage space, a faster better processor, and the like) provides more and better value-added applications. Upon identifying different pairs of glasses, the display apparatus 30c positively provides each pair of glasses with its identification code. In another embodiment, the display apparatus also carries audio data and/or vibration data in the remote control signal or other radio signals, which are transmitted to the pair of glasses, and the user can enhance visual telepresence via audio waves and sounds transmitted by pair of glasses.

Combined with the embodiment in FIG. 1, the pair of glasses 10c further includes a proximity sensor 22 to sense whether the pair of glasses is worn by the user, and to provide a corresponding proximity signal Sc to the controller 20c. For example, when the proximity sensor 22 senses that the user has taken off the glasses 10c, the controller 20c control the pair of glasses 10c to enter the standby status or to completely shut down the power supply, as well as transmits the corresponding status signal STc to the transmitting circuit TxGc before the power supply circuit 14c stops providing power supply, so that the display apparatus 30c performs corresponding operations. For example, the display apparatus 30c automatically enters the standby status or shuts down the power supply, or inquires the user who determines subsequent operations of the display apparatus 30c. When the proximity sensor 22 senses that the user again wears the pair of glasses 10c, not only the pair of glasses 10c automatically awakes to begin operating, but also controls operations of the display apparatus 30c via the status signal STc transmitted by the transmitting circuit TxGc. For example, the status signal controls the display apparatus 30c to awake from the standby status to continue with the foregoing paused 3D display. Or, the status signal controls the display apparatus to turn from the 2D display to the 3D display, and/or to remind the user for further operations. In other words, the proximity sensor 22 not only automatically reduces power consumption of the pair of glasses 10c, but also further remote controls the display apparatus 30c to improve operating efficiency and application value of the display apparatus 30c.

In an embodiment, when the proximity sensor 22 is a mechanical push-button switch, on which appropriate elastic damping is configured. When the user takes off the pair of glasses, a part of the mechanical push-button switch temporarily stays being pressed due to the elastic damping, but not immediately triggers the power supply circuit 14c to stop providing power supply, so that the transmitting circuit TxGc has enough time for transmitting back the corresponding status signal STc. Alternatively, when the proximity sensor 22 generates an electronic proximity signal SC in response to the situation that the user has taken off the pair of glasses 10c, the power circuit 14c only stops providing power supply to the transmitting circuit TxGc after a time delay, so that the transmitting circuit TxGc obtains enough time for transmitting the operating status of the pair of glasses 10c back to the display apparatus 30c.

Figure 4:
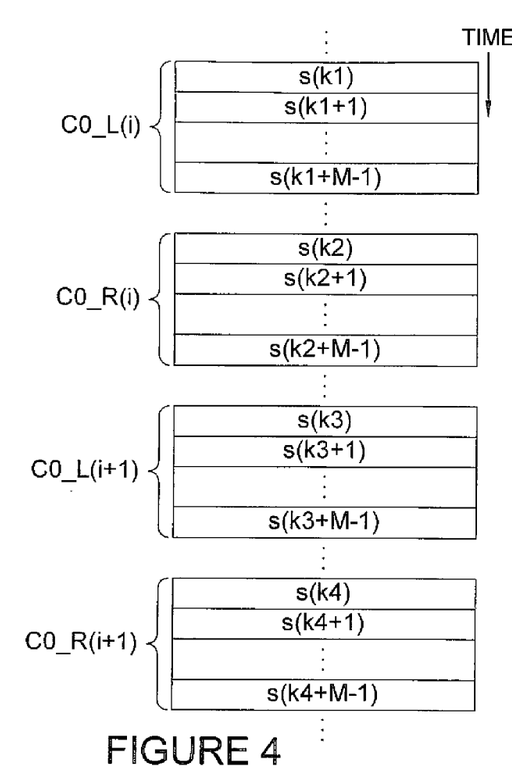
FIG. 4 to FIG. 9 are schematic diagrams of various types of 3D content formats in accordance with other embodiments of the present disclosure.

FIG. 4 to FIG. 9 are schematic diagrams of types of 3D contents in accordance with embodiments of the present disclosure. As mentioned above, the image processing modules 36b and 36c in FIG. 2 and FIG. 3 can capture 2D contents from various formats of 3D contents to display 3D contents via 2D format display. The 3D contents are 3D images synthesized by 2D picture frames, and data corresponding to the 2D picture frames are recorded by the unit of scan lines. For example, each scan line records a plurality of pixel data, and each is corresponding to components of primary color of a pixel. Frames corresponding to the 3D contents are obtained by synthesizing pixel data recorded by each scan line. In the embodiment of FIG. 4, data C0_L(i) and C0_R(i) respectively correspond to a left frame and a right frame to synthesis a 3D image, and data C0(i+1) and C0_R(i+1) respectively correspond to a left frame and a right frame of a next 3D image. With association of the pair of shutter glasses, the 3D images are displayed in sequence to display a dynamic 3D image.

In the embodiment of FIG. 4, the 3D contents carry the data C0_L(i), C0(R(i), C0_L(i+1) and C0_R(i+1) via an image frame interleaving format. In this format, for a same 3D image, the data C0_L(i) corresponding to a left frame are recorded in the scan lines s(k1), s(k1+1) to s(k1+M−1), and the data C0_R(i) corresponding to a right frame are recorded in subsequent scan lines s(k2), s(k2+1) to s(k2+M−1). Data C0_L(i+1) and C0_R(i+1) corresponding to the a left and right frame of a 3D image frame are respectively recorded in sequence in scan lines s(k3) to s(k3+M−1) and s(k4) to s(k4+M−1), where k2 is larger than or equal to (k1+M), k3 is larger than or equal to (k2+M), k4 is larger than or equal to (k3+M), and the like. Scan lines s(k1) to s(k1+M−1) correspond to a same vertical synchronization cycle, i.e., the scan lines s(k1) to s(k1+M−1) form an image frame. Likewise, the scan lines s(k2) to s(k2+M−1), s(k3) to s(k3+M−1) and s(k4) to s(k4+M−1) respectively correspond to subsequent three vertical synchronization cycles, and the like.

When the image processing modules 36b/36c retrieves the 2D content from the 3D content in FIG. 4, the picture frames corresponding to the data C0_L(i) and C0_L(i+1) are selected to form two adjacent frames of the 2D contents. The adjacent frames are shown in sequence to display a 2D dynamic image without the pair of shutter glasses. In this embodiment, when the image processing module 36b/36c operates, the format converting module 54 first temporarily stores the left and right frames of one 3D image frame into the image frame buffer 38 (e.g., the frames corresponding to the data C0_L(i) and C0_R(i)), and data corresponding to the left frame is transmitted to the scaling module 56 for scaling to display the scaled data on the display 32 driven by the driving circuit 42b/42c. The image processing module 36b/36c can also select the right frames of the 3D contents to form frames of the 2D contents.

Figure 5:
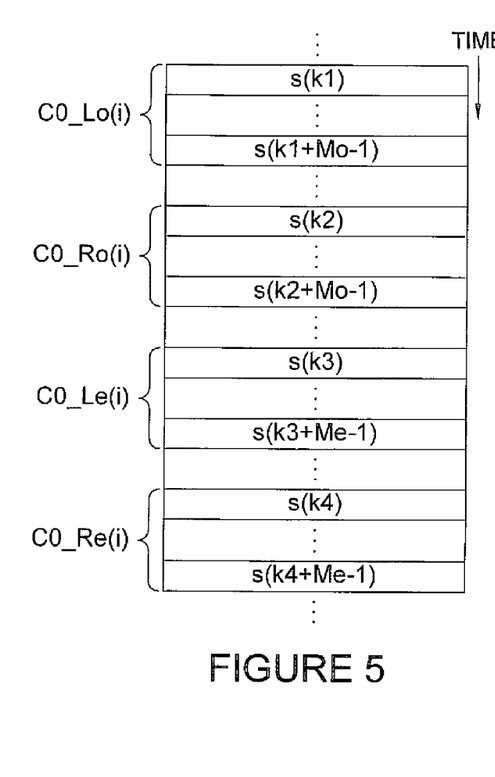

In the embodiment of FIG. 5, data C0_Lo(i) and C0_Le(i) respectively correspond to an interleaving odd image field and an even image field of a left frame, and data C0_Ro(i) and C0_Re(i) respectively correspond to an odd image field and an even image field of a right frame. In the 3D content format, the data C0_Lo(i), C0_Le(i), C0_Ro(i) and C0_Re(i) are in sequence recorded in scan lines s(k1) to s(k1+Mo−1), s(k2) to s(k2+Mo−1), s(k3) to s(k3+Me−1) and s(k4) to s(k4+Me−1), where k2 is larger than or equal to (k1+Mo), k3 is larger than or equal to (k2+Mo), k4 is larger than or equal to (k3+Me), and the like, and Mo is identical to or different from Me. The scan lines s(k1) to s(k4+Me) correspond to two vertical synchronization cycles. The scan lines s(k2) to s(k2+Mo−1) correspond to a vertical synchronization cycle, and s(k3) to s(k4+Me−1) correspond to a next vertical synchronization cycle.

The embodiment in FIG. 5 is implemented to an image frame packaging and image field alternative 3D content format. When the image processing module 36b/36c operates the 3D contents in this format, the C0_L(i) corresponding to the left frame is synthesized via the data C0_Lo(i) corresponding to the scan lines s(k1) to s(k1+Mo−1) and the data C0_Le(i) corresponding to the scan lines s(k3) to s(k3+Me−1) to form the frames of the 2D contents.

Figure 6:
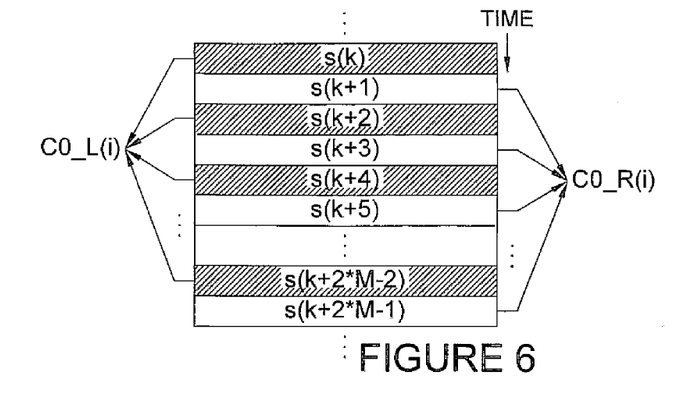

In the embodiment of FIG. 6, left and right frames of the 3D contents are recorded via alternative scan lines. For a same 3D image, the data C0_L(i) corresponding to a left frame is recorded in scan lines s(k), s(k+2), s(k+4) to s(k+2*M−2) with an interval of one scan line, and the data C0_R(i) corresponding to a right frame is recorded in interlacing scan lines s(k+1), s(k+3), s(k+5), s(k+7), . . . , to s(k+2*M−1). Scan lines s(k) to s(k+2*M−1) correspond to a same vertical synchronization cycle. When the image processing module 36b/36c operates the 3D contents in this format, the scan lines s(k), s(k+2), s(k+4) to s(k+2*M−2) are synthesized to the data C0_L(i) corresponding to the left frame so as to form the frames of the 2D contents.

Figure 7:
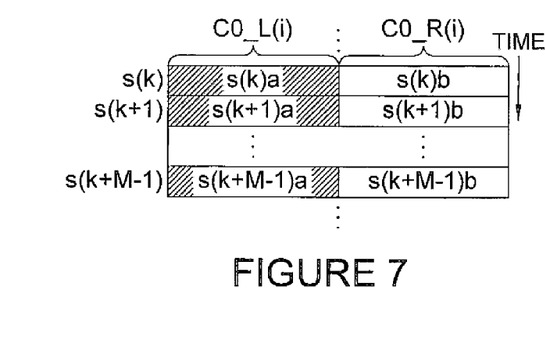

In FIG. 7, the 3D contents are recorded via a side by side format. The scan lines of the 3D contents are divided into two parts each corresponding to a plurality of pixels. For example, the scan line s(k) is divided into scan line segments s(k)a and s(k)b, the scan line s(k+1) is divided into scan line segments s(k+1)a and s(k+1)b, and the like. For a same 3D image, the data C0_L(i) corresponding to a left frame is recorded in the scan line segments s(k)a, s(k+1)a, s(k+2)a to s(k+M−1)a, and the data C0_R(i) corresponding to a right frame is recorded in the scan line segments s(k)b, s(k+1)b, s(k+2)b to s(k+M−1)b. The scan lines s(k) to s(k+M−1) correspond to one vertical synchronization cycle. When the image processing module 36b/36c operates the 3D contents in this format, retrieved from the scan line segments s(k)a, s(k+1)a to s(k+M−1)a, the left frame corresponds to the data C0_L(i) forms the 2D contents.

Figure 8:
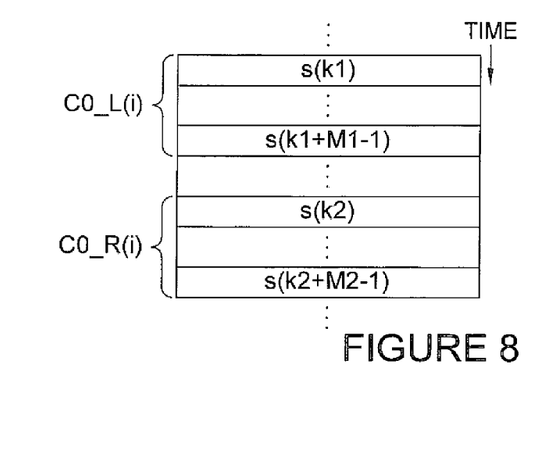

In FIG. 8, the 3D contents are recorded via an up and down (or top and bottom) approach. For a same 3D image, the data C0_L(i) and C0_R(i) respectively corresponding to the left frame and the right frame are respectively recorded in scan lines s(k1) to s(k1+M−1), and subsequent scan lines s(k2) to s(k2+M2−1), where k2 is larger than or equal to (k1+M−1), and Ml may be equal to M2. The scan lines s(k1) to s(k2+M2−1) correspond to one vertical synchronization cycle. With respect to the 3D content format, the image processing module 36b/36c retrieve the left frame corresponding to the data C0_L(i) to form the 2D contents.

Figure 9:
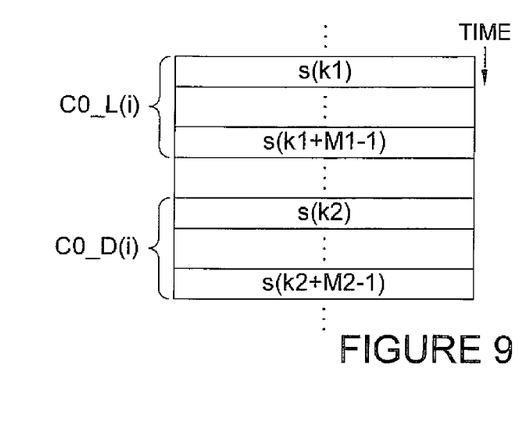

In FIG. 9, each 3D image of the 3D contents is formed by the data C0_L(i) associated with a depth data C0_D(i). The left and right frames of the 3D image is calculated via the data C0_L(i) and the depth data C0_D(i). The data C0_L(i) is recorded in the scan lines s(k1) to s(k1+M1−1), and the depth data C0_D(i) is recorded in the scan lines s(k2) to s(k2+M2−1), where k2 is larger than (k1+M−1). The scan lines s(k1) to s(k2+M2−1) correspond to one vertical synchronization cycle. With respect to the 3D content format, the image processing module 36b/36c first calculates data corresponding to the left and right frames via the scan lines s(k1) to s(k2+M2−1), and then fixedly selects one of the left and right frames to form the 2D contents.

In the embodiments of FIG. 4 to FIG. 9, the number of overall pixel data of the scan lines/scan line segments need not be equal to that of pixels of an overall screen of the display 32 in FIG. 2/FIG. 3. For example, the display 32 has a resolution of 1920*1080, i.e., an image frame has 1920 pixels in a horizontal direction, and 1080 pixels in a vertical direction. However, in FIG. 7, each of the scan line segments has 980 pixel data, and the data C0_L(i) and C0_R(i) are respectively recorded in 1080 scan line segments (i.e., M is equal to 1080 in FIG. 7). When the display 22 displays the frame corresponding to the data C0_L(i) or C0_R(i) on the overall screen via 2D display, the scaling module 56 performs appropriate associated interpolation and/or scaling processing (e.g., horizontal scaling) to extend to the overall screen resolution of 1920*1080 according to 980 pixel data of 1080 scan line segments.

Likewise, in FIG. 8, the data C0_L(i) and C0_R(i) are respectively recorded in 540 scan lines (i.e., M=Mt=540) each comprising 1920 pixel data. Therefore, when the frame corresponding to the data C0_L(i) or C0_R(i) is displayed via the 2D display, the scaling module 56 also performs scaling processing (e.g., vertical scaling) to display the frame corresponding to the data C0_L(i) or C0_R(i) on the overall screen having the resolution of 1920*1080 via the 2D display.

In conclusion, compared to the conventional playback system, a 3D content playback system provided by the present disclosure improves efficiency and application values of a pair of shutter glasses via a proximity sensor configured at a terminal of the pair of glasses, and provides numerous value-added applications to the overall playback system with association of a bi-direction communication channel between the pair of glasses and the display apparatus. In another embodiment, numerous value-added applications are provided to the playback system via an image capturing apparatus and an identification module at a terminal of display apparatus. The foregoing value-added applications are capable of increasing efficiency of the playback system and reducing unnecessary power consumption, and it is more instinctive and more convenient for a user to operate the playback system.

Display apparatuses according to the foregoing embodiments are also applied to 2D display, i.e., according to the present disclosure, 2D contents are captured from 3D contents and are displayed via the 2D display. By applying the present disclosure, a 2D display apparatus without 3D display capability is also compatible to 3D sources for providing 3D contents so as to accurately and comfortably display the 3D contents via the 2D format display. The 2D display apparatus comprising a display and an image processing module is capable of capturing to-be displayed 2D contents from 3D contents in various types of formats. The image processing module comprises a format determining module, a format converting module and a scaling module. The format determining module determines a format, of the 3D contents, for carrying left and right frames of 3D images. The format converting module fixedly selects the left frames of the 3D images to form the to-be-displayed 2D contents. The scaling module performs appropriate horizontal and/or vertical scaling on the frames to conform to a resolution of the display. The image processing module and a controller of the display apparatus are integrated to one chip, e.g., the controller and the image processing module are realized from executing by a microprocessor of the chip firmware and/or software program codes.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising:
   a display, operating in a three-dimension (3D) mode or a two-dimension (2D) mode, that displays a 3D image content when operating in the 3D mode, and displays a 2D image content when operating in the 2D mode;
   a controller that controls the display to operate in one of the 3D mode and the 2D mode and generates a remote control signal to control a pair of glasses, the remote control signal including an identification instruction requesting for an identification code of the pair of glasses, the remote control signal further including both of audio data to be audibly played by the pair of glasses and vibration data configured to cause the pair of glasses to vibrate;
   a transmitting circuit configured to transmit the remote control signal to the pair of glasses; and
   a receiving circuit that receives a status signal from the pair of glasses, the status signal indicating the identification code of the pair of glasses and an indication of a power supply status of the pair of glasses that allows the display to show the power supply status to the user by on-screen display (OSD),
   wherein the 3D image content carries at least one set of a left frame and a right frame, each set forms a 3D image, and
   wherein the display apparatus further comprises:
   an image processing module that retrieves the 2D image content from the 3D image content; and
   a format converting module that extracts the at least one set of the left frame and the right frame from the 3D image content, and selects one frame from each set of left and right frames to form the 2D image content,
   wherein the display apparatus automatically displays the 2D image content when the status signal indicates power supply for the pair of glasses is interrupted, and
   wherein the display apparatus is configured to record a plurality of operating parameters for a plurality of pairs of glasses including predetermined audio volumes for speakers in respective pairs of glasses.

2. The display apparatus as recited in claim 1, wherein the 2D image content is generated according to the 3D image content, and the controller selectively outputs the 3D image content and the 2D image content to the display.

3. The display apparatus as recited in claim 1, wherein the controller of the display switches the operating modes of the display according to the status signal so that the display displays the 3D image content to match operation of the pair of glasses, from which the status signal is transmitted, and the status signal is related to an operating status of the pair of glasses.

4. The display apparatus as recited in claim 1, wherein the controller selectively outputs the 3D image content and the 2D image content to the display according to the status signal.

5. The display apparatus as recited in claim 1, wherein the image processing module further comprises:
   a format determining module that determines a format of the 3D image content, with the format converting module extracting the at least one set of left and right frames from the 3D image content according to the format.

6. The display apparatus as recited in claim 1, wherein the image processing module further comprises:
   a scaling module that scales the selected frame according to a resolution of the display.

7. The display apparatus as recited in claim 1, further comprising:
   an image capturing apparatus that captures an image;
   an identification module that determines whether the pair of glasses is worn according to the image to provide an identification result; and
   a controller that controls the display according to the identification result.

8. The display apparatus as recited in claim 1, wherein the transmitting circuit is further configured to transmit a radio signal according to an audio signal associated with image content.

\* \* \* \* \*